(No Model.)
E. W. DOOLITTLE.
ROAD CART.
No. 426,369. Patented Apr. 22, 1890.
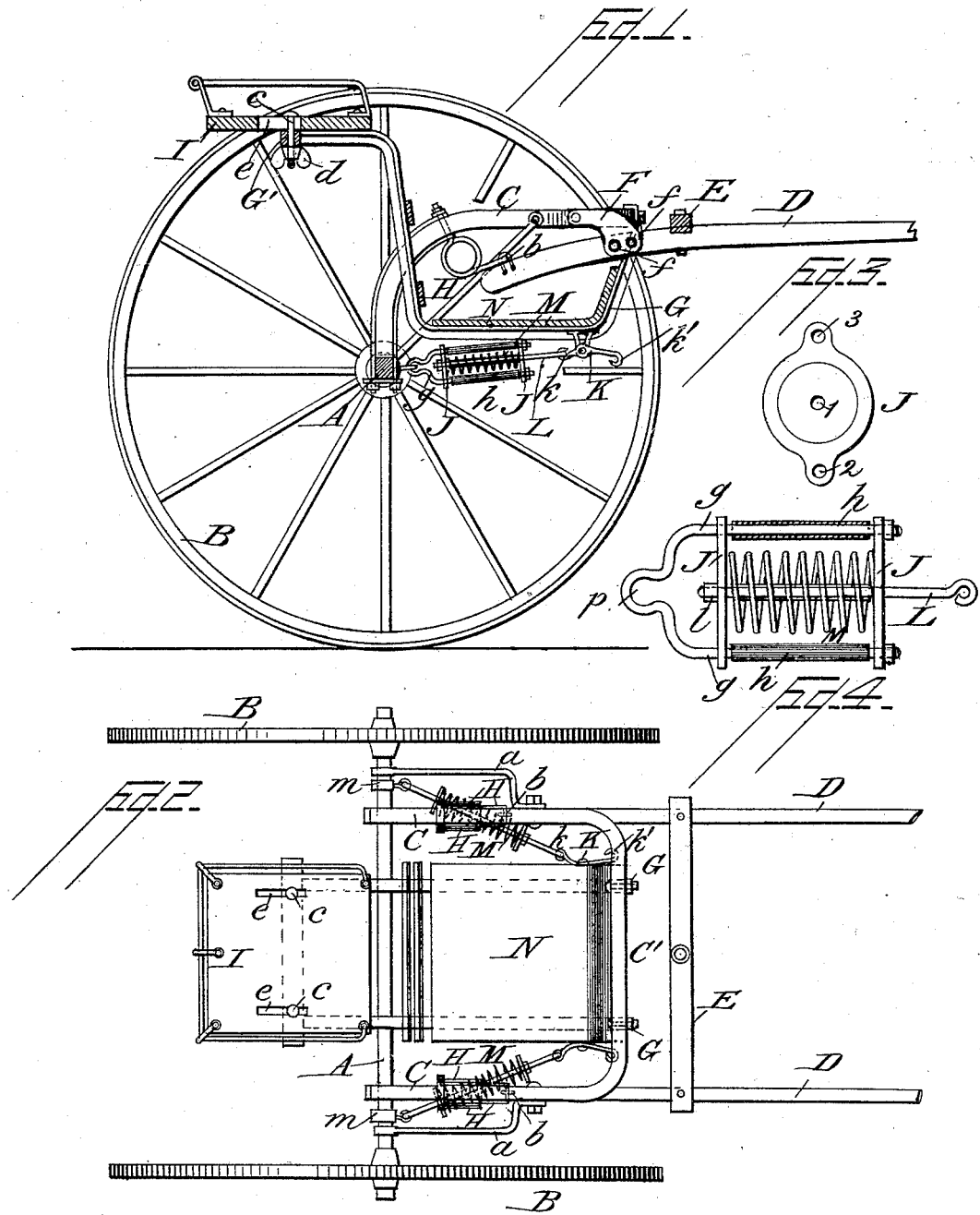

UNITED STATES PATENT OFFICE.

EMMET WARREN DOOLITTLE, OF GARDEN GROVE, IOWA.

ROAD-CART.

SPECIFICATION forming part of Letters Patent No. 426,369, dated April 22, 1890.

Application filed January 15, 1890. Serial No. 336,994. (No model.)

*To all whom it may concern:*

Be it known that I, EMMET WARREN DOOLITTLE, a citizen of the United States, residing at Garden Grove, in the county of Decatur and State of Iowa, have invented certain new and useful Improvements in Road-Carts; and I do hereby declare the following to be a full, clear, and exact description of the invention, such as will enable others skilled in the art to which it appertains to make and use the same.

My present invention relates to that class of vehicles commonly denominated "road-carts," and more particularly to that division of the general class known as "two-wheeled vehicles," its object being to simplify and perfect the construction of a road-card, so as to add to its strength and durability and lessen, if not completely obviate, the undesirable vibratory jolting usually incident to vehicles of this class as a consequence of the movements of the horse; and to this end my invention consists, essentially, in the construction, arrangement, and combination of parts, substantially as will be hereinafter fully described, and then more particularly pointed out in the appended clauses of the claim.

In the annexed drawings, illustrating my invention, Figure 1 is a sectional side elevation of my improved two-wheeled vehicle. Fig. 2 is a top plan view of the same. Fig. 3 is a side view of one of the end plates belonging to the springs beneath the cart. Fig. 4 is a view of one of the supporting-springs located beneath the cart.

Like letters of reference designate corresponding parts throughout the different figures of the drawings.

A denotes the cart-axle, and B B the two wheels suitably mounted to turn thereon.

Upon the axle are secured the upwardly and forwardly extending short shafts C C, which are united near their front ends by the transverse beam or bar C', formed integral with said curved shafts, the junction of the transverse beam with each short shaft being preferably an easy bend or curve, as shown, so that the short curved shafts and their transverse connection are made of a single piece properly shaped and bent to suit this construction. It is found much better to make these parts of one piece than of separate pieces, as the former plan dispenses with the necessity of bolts, &c., as well as affording a neater, stronger, and more compact arrangement.

The shafts C C are braced by means of the diagonal or inclined braces *a a*, which are connected by bolts or other suitable devices to the shafts and by clips or other convenient means to the axle, and also are so bent as to allow of their being bolted to the outer side of the shafts above and to form a sort of yoke.

At the front or forward ends of the short shafts C, near their junction with the transverse connecting-bar C', are fastened the lugs F F, on which are pivoted the long shafts D D, to which the horse is harnessed, said long shafts extending rearwardly beyond the lugs to points beneath the curved shafts C. Each long shaft D is furnished near its rear end with a hook, loop, staple, or catch device *b*, which is engaged by one end of a spring H, preferably coiled in the manner shown in Fig. 2, the other end of each spring H being fastened to the contiguous shaft C at a suitable point thereon. (See Fig. 1.) The lugs F F, to which the long shafts D D are pivoted, are provided with a series of two or more holes or apertures *f f*, to permit the convenient adjustment of the shafts D D and the change of the pivotal point with loads of varying weight. Such adjustment as this will probably be required only with extremely heavy loads. The shafts D D are connected at a point forward of the beam C' by the usual cross-bar E, on which is pivoted the whiffletree, to which the harness-traces are fastened.

To the transverse integral connection C' are secured bent bars of T-shaped steel or other suitable material G G, which support the bed or platform N. These bent bars G extend slightly forward at the points where they are bolted or otherwise secured to the integral connection C'. Then they pass downward and backward beneath the flooring of the platform or bed; then upward at the rear of the platform, and then rearward horizontally to form the supports of the seat for the vehicle occupant. These two bars G are securely fixed in their position by means of a bar or plate G′, extending from one to the other of said bars, to which they are riveted or otherwise fastened, the seat I resting upon this transverse bar and the horizontal end portions of the bent bars. The seat I is provided with parallel slots e e, through which pass the bolts c c, which also pass through the transverse bar G′, the lower threaded ends of the aforesaid bolts having the winged thumb-nuts d screwing thereon against the under side of the bar G′, so as to hold the seat I in place. The slots e e permit the longitudinal adjustment of the seat correspondingly with the weight mounted thereon.

The combined weight of the seat and bed and the load thereon is supported by two springs arranged beneath the cart, one on each side thereof, the rear ends of said spring devices being secured to the axle near the wheel-hubs, while the front ends of said devices are connected to the bed near the lower front corners of each side of it. The bent bars G G, at points on these corners of the bed, are provided with outwardly-projecting braces or arms, each one of which carries a double hook K, swiveled, pivoted, or otherwise movably connected to the supporting-braces, said double hooks having each a short hook k and a long hook k′, and being arranged so as to be reversed in position by swinging upon their pivotal points, so as to bring into use the long arm or the short arm, as occasion may require.

The spring devices are constructed as follows: M denotes a coiled spring adapted for compression and extension in the usual manner. This coiled spring is situated between two parallel end plates J J, each having a central perforation 1, and also perforations 2 and 3, similarly disposed with relation to the central perforation, and all three perforations being in line with each other. A length of wire is bent into the form of a loop P to provide an eye p and parallel rods g g, one of which rods passes through the perforations 3 3 of the two end plates, while the other rod g passes through the perforations 2 2 of the end plates, the ends of rods g g having nuts thereon, as shown. A wire rod L passes through the perforations 1 1 of the plates, and consequently runs centrally through the spring M. The rod L has a nut l on one end and is provided with an eye at its other end. Thus the rod L is adapted to compress the spring from one direction by forcing one of the end plates against it, while the loop P is adapted to compress it from the other direction by forcing the other end plate against it. On the axle are clips m, having hooks. To these hooks the rear ends of the spring devices are connected by causing the hooks to engage the loop-eye p. The rod L has its eye engaged by one leg of the double hook above mentioned. This hook, as we have seen, is adjustable for light and heavy loads. The seat may be raised or lowered at pleasure by changing the connection of the double hook with the spring devices. All that is needed to accomplish the adjustment is simply to unfasten one hook, reverse the hooking device, and fasten its other hook. The portions of the wires g g and wire rod L lying between the end plates are surrounded or enveloped by rubber or elastic tubes h. The purpose of these rubber tubes is to cushion the metallic wires, so as to prevent the noise and rattling that might occur by the striking together of the otherwise unprotected wires and the spring during the movements of the vehicle. The rattling of the coiled springs is a common disadvantage of their use; but I prevent all this in a cheap and efficient manner. These rubber parts are not injured or put out of shape by wet or bad weather, but are found to be serviceable at all times.

The operation of the vehicle may be briefly stated as follows: Suppose the vehicle to be in motion. The jogging or unpleasant vibratory movement commonly felt in road-carts will be absent because the long shafts are pivoted to the short shafts, and springs are interposed between the ends of the long shafts and the short shafts. Furthermore, the two spring devices are used for supporting the bed and seat. This plan of attaching a carrying-spring is considered a great improvement over the methods now in use for this reason: when there is a direct downward force exerted upon the spring, as is the case with the common modes of attachment, if the wheel drops into a rut or hole or the carriage is running on uneven ground, this motion will be communicated directly to the bed and seat, because they are so nearly over the axles; but in my construction the drop of the wheel only carries downward the rear end of the springs, and consequently the full extent of the drop is only felt at that point, and hence is transmitted only in a partial degree to the point of attachment at the front corner of the bed. As this point is a foot or more in front of the axle and diagonal thereto, it is not perpendicular to the fall, and the nearer you approach the point of attachment to the horse the less degree of wheel motion will be sustained. Furthermore, it will be seen that when the load is placed upon the cart it will cause the rear ends of the long shafts to be elevated, so as be nearer to the short shafts, and then as the horse travels and the pivotal points of the long shafts are lifted intermittently, the springs under the short shafts recoil, allowing the rear ends of the long shafts to be depressed enough to take up the entire motion caused by the points being raised during the step motion of the horse, thereby maintaining the bed and the independent frame to which it is attached in a level easy position, entirely independent of and unmoved by the jogging of the horse.

Having thus described my invention, what I claim as new, and desire to secure by Letters Patent, is—

1. The combination of the short shafts curved forward and upward from the axle, and their transverse horizontal connection integral with them, the bed and seat carrying bars secured at their forward ends to said transverse connection, and supporting coiled springs for said bars connected thereto and to the axle, substantially as described.

2. The combination, with short shafts secured at their lower ends to the axle and curved upward and forward therefrom, of the transverse connecting-beam, the bent bars fastened to said beam and arranged to support the platform or bed and likewise the seat, the upper ends of the bars being projected rearward of the axle, and supporting coiled springs for said bars located beneath and connected thereto and likewise to the axle, substantially as described.

3. The combination of short shafts secured to the axle, their transverse connecting-bar, long shafts pivotally connected with the short shafts, intermediate springs between the rear ends of the long shafts and the adjacent portions of the short shafts, the bars connected to the transverse connecting-bar and suitably bent to provide supports for the platform or bed and also for the seat, and the adjustable spring devices, coiled and operating substantially as described, for supporting said bars, located beneath them and fastened to them and likewise to the axle.

4. The combination of short shafts secured to the axle, the long shafts pivotally connected to the short shafts, the bars connected to the transverse connection between the short shafts and suitably bent to provide supports for the platform and seat, and the helical springs for supporting said bars, fastened thereto and to the axle.

5. The combination of short shafts secured to the axle, the beam connecting their forward upper ends, the lugs on the short shafts having one or a series of holes, the long shafts adjustably pivoted to said lugs, and the springs engaging loops or hooks on the rear ends of the long shafts and fastened to the springs on bent portions of the short shafts.

6. The combination, with the short shafts, the long shafts pivoted thereto, and the bent seat-supporting bars secured at their forward ends to the connecting-beam between the long shafts, of the spring devices for supporting said bars, each consisting of a coiled spring, perforated plates between which it is located, a wire loop engaging the axle and connected to said plates, and a rod running centrally through the coil connected to the plates and engaged by a hook on the under side of the bent bar, as specified.

7. The combination of the short shafts, the long shafts pivotally connected thereto, the transverse connection between the short shafts, the seat-supporting bars connected to said transverse connection, and the spring devices supporting said bars, consisting each of a coiled spring, two perforated end plates, a wire loop connected to one of the plates and passing through the other, a wire rod connected to one of the plates and passing through the other and the coil, and the double hook having a long and a short arm and pivoted to a brace on the bent bar, as specified.

8. The combination, with the short shafts, the long shafts pivoted thereto, and the bent seat-supporting bars secured at their forward ends to the connecting-beam between the short shafts, of a spring device for supporting said bars, consisting of a coiled spring, a wire loop of said spring engaging the axle and a wire loop, and the opposite end of said spring being engaged by a hook on the under side of the bent bar, substantially as described.

9. The combination of the short shafts, the long shafts pivotally connected thereto, the transverse connection between the short shafts, the seat-supporting bars connected to said transverse connection, and the spring devices supporting said bars, consisting each of a coiled spring engaging at one end with the axle and at the other with a double hook held in the long and the short arm and pivoted to the brace on the bent bar, substantially as described.

In testimony whereof I affix my signature in presence of two witnesses.

EMMET WARREN DOOLITTLE.

Witnesses:
LOUIS J. EDE,
G. M. MILLER.